Patented Feb. 12, 1924.

1,483,738

UNITED STATES PATENT OFFICE.

LEON LILIENFELD, OF VIENNA, AUSTRIA.

PROCESS OF MAKING HIGHLY-ETHERIFIED ETHERS OF CELLULOSIC BODIES.

No Drawing.   Application filed January 10, 1921.   Serial No. 436,380.

*To all whom it may concern:*

Be it known that I, LEON LILIENFELD, of Podhajce, Poland, a citizen of Poland, residing at 1 Zeltgasse, Vienna VIII, Austria, have invented certain new and useful Improvements in and Relating to the Processes of Making Highly-Etherified Ethers of Cellulosic Bodies (for which I have filed patent applications in foreign countries as follows: In Austria, April 1, 1919, and August 6, 1919; in Germany, August 25, 1919, and others at later dates), of which the following is a specification.

Of cellulose and its conversion products and derivatives, those alkyl ethers which contain a low number of alkyl groups, i. e., those in which a few only of the hydroxyl hydrogen atoms are replaced by alkyl groups, have the common feature that the field of utility is very restricted compared with the field of utility of the alkyl ethers of the higher stages of alkylation. The reasons for this lie in the properties that are peculiar to the various alkyl-ethers of cellulose poor in alkyl-groups. Thus for example, low ethylation and methylation products of cellulose, while soluble in a number of organic solvents, they are also soluble or capable of swelling in cold water. Conversely, the aralkyl ethers, notably the benzyl-ethers of cellulose, which are poor in aralkyl-groups, while insoluble in water, are also practically insoluble in the important industrial organic solvents. The expression "cellulosic bodies" means cellulose itself, and its conversion products or derivatives; the expression "ethers" means alkyl and aralkyl derivatives, and the expression "etherification" means alkylation or aralkylation.

The expression "to etherify," means to alkylate or aralkylate, and the expression "etherifying agents" means alkylating or aralkylating agents.

It is only when the number of alkyl-groups introduced is relatively great, that the alkyl-ethers of cellulose possess properties which give them a wide field of technical utility. The increase in the number of alkyl-groups which is effected by observing suitable conditions of working, opens up for the ethyl-ethers and methyl-ethers of cellulose, not only an extraordinary increase in the series of organic solvents in which they may be dissolved, but also causes their solubility or capacity to swell in water to disappear. In the case of the benzyl-ethers of cellulose, as well as of its conversion products and derivatives, the increase in the number of benzyl-groups procures an excellent degree of solubility in organic solvents.

The manufacture of alkyl-ethers of cellulose which are insoluble in cold water, and especially those that do not swell in cold water, but are soluble in a sufficiently large number of volatile solvents, was possible hitherto only when the alkylation took place in the presence of a large excess of alkali, either calculated on the amount of cellulose or on the amount of alkylating agents or on both. (See for instance U. S. Patent 1,188,376.)

To illustrate the above statement, if alkali-cellulose be taken as the starting material, then the latter had to be treated with very large excesses of alkali in order to obtain alkyl-celluloses having the properties required for technical use. (See for instance U. S. Patent No. 1,183,376, Example XI.) If according to Example VIII of said patent there were taken as the primary material the conversion products or derivatives of cellulose which are soluble in alkalies and have many advantages for the alkylation of cellulose and the operations were therefore effected in alkaline solution, then for the two-stage working given in the said example, it would be necessary to treat the reaction masses (produced in the first alkylation stage, and containing alkyl-celluloses of a lower degree of alkylation) with considerable excesses of alkali and alkylating agents in order to produce alkyl-celluloses which are soluble in a sufficiently large number of organic solvents and—in so far as ethyl and methyl celluloses are concerned—are further insoluble in cold water, or are resistant to cold water.

This technically desirable result is not attained by operating in the manner usually employed in alkylating other alcohols with quantities of alkali which are calculated on the alcohol or on the alkylating agents or on both or with quantities of alkali that do not exceed the theoretical quantities, by any considerable extent.

If for instance the alkali-soluble derivatives or conversion products of cellulose are employed as starting material, and if as in the Examples VIII, VII or similar examples of U. S. Patent 1,188,376, even very large excesses of ethylating agents be used, but at the same time only quantities of alkali are introduced which are calculated on these ethylating agents or do not considerably exceed the calculated amounts, and which therefore when calculated on the cellulose, still show a very large excess, then ethyl-celluloses of a higher degree of ethylation will be produced which are insoluble even in cold water and are soluble in a number of organic solvents, but which, however, are not sufficiently permanent against cold water either in their flocculent or pulverulent original condition or in the form of products made therefrom, such as films and the like. If for instance a film made from an ethyl-cellulose of this kind be subjected to the action of very cold water, for instance at 1° C., then this film will swell up, will become jellified, slippery and crumbly. If the amount of alkali be increased by a not very considerable amount then the film made from the corresponding cellulose-ethyl-ether will withstand ice-cold water much better. In fact it certainly does not become jellified and also not crumbly, but it shows in ice-cold water still an appreciable degree of extensibility. Only when the percentage of alkali of the reaction mixtures has been increased to quite an extraordinary degree, can there be obtained according to the examples VIII, VII, etc., of Patent No. 1,188,376, ethyl-celluloses which have perfect resistance even against ice-cold water, and which ethers further are soluble in the large number of organic solvents so important in the industries.

If for instance benzylation is effected according to the methods stated for the ethylation in the Examples VIII, VII, etc., of said patent, then again considerable excesses of alkali must be employed in order to produce benzyl-celluloses which possess the desired degree of solubility in a number of solvents sufficiently large for industrial purposes.

If alkali-cellulose be chosen as the starting material, then considerable excesses of alkali calculated on the cellulose must be used if the intention is to produce alkyl-celluloses that are free from the above described disadvantages, namely, solubility in cold water or insufficient resistance to cold water or insufficient solubility in organic solvents. Likewise, if aralkyl ethers of cellulose are desired, having a sufficient solubility in organic solvents, then also considerable excesses of alkali must be used, when using alkali cellulose as the starting material.

Operating with large excesses of alkali is, however, accompanied by very considerable objection. First it increases the cost of working considerably due to the cost of the excessive quantities of chemicals used. There is also the important fact that large excesses of alkali decompose any excesses of alkylating agents or aralkylating agents that may be employed, especially in a heated state, so that the latter cannot be recovered as such by distillation, separation, etc. In any case, with the introduction of large excesses of alkali, the systematic recovery of any excesses of alkylating agents or of aralkylating agents which may be employed (and when di-alkyl-sulphates are used, the systematic recovery of the second alkyl-groups that have not come into reaction) is either not possible or they can only be recovered in the form of alcohols or ethers. Moreover, a recovery of the alkalies used in excess seems to be practically impossible. There is further the serious disadvantage that so long as the ethers of the higher degrees of alkylation or aralkylation are not formed, extreme care must be taken with the addition of alkali and the temperatures when large excesses of alkali are used. The ethers of cellulose, of lower degrees of etherification are very sensitive to alkali-hydroxides, especially in a heated state, owing to the free hydroxyl-groups contained in them. Certainly the alkyl-groups or aralkyl-groups that have been introduced are not split off by the action of alkalies under the action of heat; but the non-alkylated or non-aralkylated part of the molecule is liable to undergo a change, probably in the sense of splitting (i. e., depolymerization). This is shown by the fact that products produced from cellulose ethers which have been treated in the intermediate form of the ethers of a lower degree of etherification with considerable quantities of alkali-hydroxides under the action of heat, have not by far the advantageous properties which are possessed by the ethers of cellulose which have not been attacked in heat by alkali-hydroxides during the etherification. This circumstance diminished considerably the reliability and uniformity of the etherification processes hitherto employed.

The discovery of a process which enables the alkylation or aralkylation of cellulose with the calculated quantities (or not very considerable excesses) of alkali, has been an extremely important technical desideratum.

The surprising discovery has now been made that ethers of cellulose of lower degrees of etherification, (that is to say, for instance, the water-soluble or cold water sensitive ethyl or methyl-ethers of cellulose or the insoluble or difficultly soluble benzyl-ethers of cellulose) can be converted into ethers of higher degrees of etherification in the presence of quantities of alkali which can be regarded as moderate compared with the quantities hitherto required, by removing the water wholly or partially from the reaction mixtures containing the ethers of the lower degrees of etherification before the further etherification, and effecting the further etherification with the exclusion of water or in the presence of only moderate quantities of water, i. e., an amount of water not substantially exceeding 6.83 times the weight of the cellulose used as primary material or that amount used in the preparation of the primary material under etherification.

The improved process of this invention thus renders possible amongst other things, the conversion of cellulose ethers (including the alkyl-ethers) of lower degrees of etherification (alkylation) into (alkyl)-ethers of higher degrees of etherification (alkylation) by means of quantities of alkali which are calculated for the amounts of the etherifying (alkylating) agents employed or which do not considerably exceed such amounts.

It is to be understood that the amounts of alkali required for the further etherification (alkylation) may be incorporated with the reaction mixtures also before the water is driven off. In such a case care must be taken that the alkalies do not damage the (alkyl)-ethers of lower degrees etherification (alkylation). If the operation is carried out in this sense according to the present invention with only small excesses of alkali, then in spite of the incorporation of the alkalies before the water is driven off, there will always be produced useful (alkyl)-ethers of higher degrees of etherification (alkylation).

It has further been discovered that the present process brings with it also a considerable technical advantage when instead of operating with small, that is to say, for instance calculated quantities of alkali or inconsiderable excesses of alkali, operations are made with considerable excesses of alkali. In such a case the present process gives rise to the technical advantage that technically perfect (alkyl)-ethers of a higher degree of etherification (alkylation) can be obtained with smaller quantities of etherifying (alkylating) agents than when working in the presence of water in excess of the amounts herein prescribed. The products obtained in this manner can be freed much better and in a much shorter time from the reaction by-products by washing with water, and the yields are better than when working in the presence of excessive amounts of water.

From what has been said, the idea might be formed that the dehydration of the primary materials or their solutions, and the effecting of the entire alkylation, beginning with the treatment of the primary materials, in the absence of water or in the presence of small quantities of water, might be effected.

Such a process however meets either insurmountable difficulties or difficulties which are so great as to render the process practically impossible.

For instance it is practically impossible by driving out the water to free from water the alkaline solutions of the alkali-soluble cellulose derivatives and conversion products. They soon change in a manner which is highly disadvantageous for the subsequent alkylation or aralkylation. They precipitate either in the form of a jelly or as curds, and then they can no longer be satisfactorily alkylated or aralkylated.

The drying of the alkali compounds of the cellulose, meets with great difficulties. The removal of the water at room temperature is extremely troublesome and time taking. Even under reduced pressure and with the use of kneading devices, a dehydration of this kind takes a considerable length of time. If the temperature is raised, then there is a risk of depolymerizing the cellulose by the alkali. As a matter of fact, alkali compounds of cellulose, which have been provided with the necessary quantities of alkali for the whole alkylation process, experience a considerable alteration when they are dried in the air or in a vacuum with the use of heat. They are converted into depolymerization products whose ethers in the form of technical articles are by far inferior to the corresponding ethers of cellulose which has not been so changed. The tediousness of the drying process and the extent of the depolymerizing action of the alkalies are in direct ratio to the quantity of the alkali contained in the alkali-compounds and the drying temperature.

The circumstances are however quite different when an ether of a lower degree of etherification has been formed. This ether withstands the action of heat and can therefore be freed from water easily and quickly without suffering any change in its chemical or physical properties. It is to be noted that there is, in such a case, no considerable amount of free alkali present.

As indicated above, the process also has advantages in the further etherification (alkylation or aralkylation) of cellulose ethers of low degree of etherification, which have been produced either from alkali cellulose or from other cellulose derivatives whether soluble or insoluble in alkali.

The process will now be described more fully with reference to alkali-soluble cellulose conversion products or derivatives as starting materials.

As alkali-soluble conversion products or derivatives there may be employed amongst other substances, raw or purified viscose of any degree of reversion (for instance a solution of cellulosexanthogenate or the like produced according to the process described in Patent No. 1,379,351, further alkali-soluble cellulose-hydrates (acid-cellulose and the like), such as are obtained by the treatment of all kinds of cellulose with hot solution of caustic alkali or Schweizer's re-agent; further, the alkali-soluble hydro-celluloses (Flechsig's amyloid, Ekström's acid-cellulose, Guignet-cellulose and the like) which are obtained by treating cellulose with strong mineral acids and water-precipitation; the cellulose depolymerization products such as are obtained by treating cellulose with zinc-haloids separately or together with acids, and subsequent precipitation; further, the alkali-soluble conversion products which are produced by the action of saponifying agents upon cellulose-esters; the cellulose-hydrates produced by extensive heating of viscose according to German Patent No. 155,745; and artificial silk waste, etc.

For the purpose of carrying out the process, an alkali-soluble cellulose derivative or conversion product is dissolved in aqueous alkali, mixed with the corresponding alkylating agent, and heated until reaction ceases, that is to say, until the formation of an alkyl-cellulose of a lower degree of alkylation, for instance a water-soluble alkyl-cellulose. The addition of the alkylating agents may take place either at once before heating or drop by drop or in small portions during the heating.

After the complete conversion of the cellulose, or the corresponding cellulose derivative or conversion product into the water-soluble alkyl-ether of a lower degree of alkylation, the water is driven off from the reaction mixture; this may be done either under atmospheric or reduced pressure. By heating, the complete or partial dehydration of the reaction mixture is assisted. Obviously, working in vacuo allows lower temperatures than working under atmospheric pressure. Energetic stirring or kneading facilitates the dehydration. Under atmospheric pressure it is sufficient to employ temperatures between 40 and 100° C., whereas in vacuo the temperature may be as low as 30° C., or it may even drop to room temperature.

According to the quantity of the water driven off, either a dense cheesy pasty mass or a substance that is dry to the touch and is readily rubbed to powder is obtained. This latter product would not contain substantially over 20% of moisture. If the mass has been energetically stirred or kneaded during the driving off of the water, then there remains a more or less finely divided, fairly fine or granular powder, according to the amount of water driven off. If through insufficient stirring this is not the case, then it is advisable before further treating the residue to convert the said residue by rubbing, grinding, crushing or the like, into a finely divided condition. In order to produce the finest possible subdivision the powdered residue can also be passed through a sieve. It is of course understood that I do not restrict myself to this degree of removal of moisture.

The residue is then mixed preferably by stirring, kneading or the like, with an alkali for instance an alkali-hydroxide either in the solid form or in a very highly concentrated aqueous or alcoholic solution (40 to 50% solutions being mentioned by way of example). The addition of the alkali may be effected either at once or in small portions. A too great rise of temperature during the addition of the alkali is preferably to be avoided. Then the alkylating agent is added, and the mixture heated until the desired final product, that is to say, an alkyl-cellulose of a higher degree of alkylation which is insoluble in water, non-sensitive to water, and readily soluble in organic solvents, has been produced. The alkylating agent is added either before heating, in one portion, or is added during the heating in a number of portions or drop by drop or in the form of a slow stream.

The alkylation in the first stage, that is to say, in the manufacture of alkyl-cellulose of a lower degree of alkylation, and in the second stage, that is to say, in converting the cellulose ether of a lower degree of alkylation into an ether of a higher degree of alkylation, may be effected according to the nature of the alkylating agent, either at atmospheric pressure in vessels provided with reflux condensers or in pressure vessels (bomb-tubes, digesters or the like). It is advisable to stir or knead during the alkylation process. Any volatile by-products of the reaction, such as alcohols, ethers and the like, may be distilled off either during the alkylation or after the alkylation is completed.

The isolation of the finished final product from the reaction mixture is effected for instance by collecting, after previous addition of water, the final product upon a filtering device (filter, filter press, centrifugal machine, rotating filter and the like), thoroughly washing the said product with cold or hot water, and drying the same. If desired, the reaction mixture mixed with water may be acidulated before filtering, or the washed alkyl-ether of the cellulose may be treated with a dilute acid and again washed before drying.

As above stated, the quantity of alkali necessary for the second stage may be added, not after but before the expulsion of the water, to the reaction mixture containing the alkyl-cellulose of a lower degree of alkylation.

It is obvious that the process may also be carried out by isolating the alkyl-celluloses of lower degrees of alkylation, that is to say, for instance, the water-soluble ethyl-celluloses or the insoluble or difficultly soluble benzyl-celluloses and the like from the reaction mixture, freeing the same completely or partly from any adhering water, and then further etherifying them.

The isolation of the cellulose-ethers of lower degrees of alkylation may be effected either by boiling and washing with hot water (the water-soluble ethyl-cellulose for instance are usually soluble only in cold water, and are but slightly soluble or not at all soluble in hot water) or in the case of alkyl-celluloses of lower degrees of alkylation which are insoluble in organic solvents, by precipitating with a suitable precipitant, for instance alcohol, or a mixture of alcohol and ether, or acetone or the like.

As alkylating agents alkyl-ethers of inorganic acids such as the alkyl-haloids, the alkyl-sulphates, the alkyl-phosphates, and the like may be employed.

I have above referred more particularly to the production of the alkyl ethers of low degree of alkylation and the further alkylation thereof. The aralkyl ethers (e. g., the benzyl ether mentioned) will be prepared in a closely analogous manner, but as above noted, the mode of purifying the arakyl ethers will, as above noted, be different, due to the different solubilities thereof.

*Example.*

2,400 parts by weight of an alkaline aqueous solution of an alkali-soluble cellulose-derivative or conversion product, for instance of the cellulose xanthogenate described in Patent No. 1,379,351 or of a viscose purified by an older process, for instance by salts or salts and acids, alcohols or other precipitating agents, or a cellulose hydrate, produced by treating cellulose with a hot solution of caustic alkali or with Schweizer's reagent, and subsequent precipitation or of the cellulose hydrate produced by heating from viscose according to the process described in German Patent Nr. 155,745 or a hydro-cellulose, amyloid, acid-cellulose, Guignet-cellulose and the like produced by treatment of cellulose with strong sulphuric acid, or of another cellulose hydrate or the like containing about 200 parts by weight of cellulose employed as a starting material and about 200 parts by weight of caustic soda, are gently heated, and mixed gradually with 360–720 parts by weight of di-ethyl sulphate. The addition takes one to two hours, then if necessary the mixture is subsequently heated on the water bath.

The temperatures are for instance as follows:—

Temperature of the water bath, 30° C.
Temperature of the solution of the cellulose derivative or conversion product, 16° C.
Temperature after 15 minutes, 18° C.
Temperature after 30 minutes, 21° C.
Temperature after 45 minutes, 24° C.
Temperature after 1 hour, 27° C.
Temperature after 1 hour 15 minutes, 30° C.
Temperature after 1 hour 30 minutes, 33° C.
Temperature after 1 hour 45 minutes, 37° C.
Temperature after 2 hours, 41° C.

(Now the whole of the di-ethyl sulphate has been incorporated in the reaction mixture).

Temperature after 2 hours 15 minutes, 45° C.
Temperature after 2 hours 30 minutes, 47° C.
Temperature after 2 hours 45 minutes, 48° C.
Temperature after 3 hours, 51° C.
Temperature after 3 hours 15 minutes, 55° C.
Temperature after 3 hours 30 minutes, 53° C.
Temperature after 3 hours 45 minutes, 50° C.

The mass now has the consistency of a salve-like paste or a viscous solution which contains besides the by-products, the ethyl ether of cellulose which is soluble in cold water. This may be recognized for instance by the fact that the watery solution of a sample taken from it—in contradistinction to the primary solution—gives no precipitate with sulphuric acid, and further by the fact that a sample taken from it is soluble in glacial acetic acid. The reaction mixture is now preferably allowed to cool, if necessary, after being filtered and is heated either in an open vessel (evaporating dish or the like), or in vacuo (for instance in a vacuum kneading machine or the like) for the purpose of driving out the water, preferably being stirred or kneaded continuously.

As the temperature need not exceed 100° it is sufficient to use hot water or steam as a source of heat. If the water is expelled by heating under atmospheric pressure, it is preferable to use a temperature which is not below 40° C. It is however admissible to go up to 90–100° C. If the evaporation is carried out in vacuo the temperature may be reduced to about 30 or 40. Of course the required expulsion of water can be obtained more easily when active stirring, or kneading is employed, both under atmospheric pressure or in vacuo even without heating, more particularly when thin layers are treated or when energetic agitating or kneading is employed, but a correspondingly longer time is required.

The expulsion of water is continued until the reaction mixture has reached a weight of 500–1400 parts by weight (according to the degree of removal of water required and according to the quantity of di-ethyl sulphate used).

The figures 500 to 1400 parts correspond to ratios respectively of about 5:1 and 6.83:1, of water to actual cellulose in the material being operated upon. The evaporation is preferably continued sufficiently to bring the existing ratio down to below 6.83:1.

The resultant parts or the friable body which is dry to the touch is disintegrated if necessary, or rubbed down, and if necessary passed through a sieve, whereupon (and preferably after cooling) 70 to 150 parts by weight of powdered caustic soda or the equivalent quantity of caustic potash, the temperature being preferably reduced, are added in small portions while it is rubbed, stirred or kneaded. (If it is only intended to reduce the quantity of the alkylating agent to obtain a quick filtration or washing of the final product, the quantity of added caustic soda can be increased up to or beyond 500 parts by weight). The resultant mixture which is usually in powder form is then mixed either in an open vessel or in a closed vessel with 300-800 parts by weight of di-ethyl sulphate in one or several portions and is heated, being preferably at the same time stirred or kneaded. A steam or water bath is a sufficient source of heat. The reaction proceeds at temperatures which lie between 50 and 100° C. and is usually completed after 1-3 hours. To make quite sure, the heating can be continued for another 1-2 hours. Any alcohol or ether that may have been formed as a by-product during the reaction can be distilled off during or after the reaction. The final reaction product is mixed with or added to water and optionally after previous neutralization or acidification, is filtered. The filtered residue is then thoroughly washed with hot or cold water. The washed residue may however be treated with a dilute acid, again filtered, thoroughly washed, and then dried. The drying can be effected either in vacuo or in the presence of air and either in the cold or under the action of heat.

The first filtrates contain the sodium ethyl sulphate which has been obtained from the ethyl sulphate. If quantities of caustic soda were worked with, which were only calculated for the ethyl sulphate, or only with a small surplus, the filtrates can be evaporated, preferably in vacuo, leaving the sodium,—ethyl sulphate.

If the alkaline solution of a conversion product or derivative soluble in alkali is not to be ethylated but benzylated, the mode of operation may be derived from the example given above. It should only be remembered that the product of the first alkylation step, that is, the lower benzyl cellulose is not water-soluble, hence there is obtained as the final product of the first benzylating stage, not a solution of water-soluble cellulose ether but a flocculent or granular paste which is more or less dry to the touch. A sample is not noticeably soluble either in water or in glacial acetic acid or the like. In view of the different nature of the products of reaction, the reaction mixture obtained from the second benzylating step must be subjected for isolating the benzyl ether to a somewhat different treatment from the reaction mixture obtained by etheylating. In order to remove any surplus of benzyl chloride and the by-products of reaction (benzyl alcohol, benzylether, benzaldehyde or the like), the final product must either be steam distilled optionally under reduced pressure while being kneaded, or be treated with solvents in which the benzyl ether of a higher degree of alkylation is insoluble, while the reaction by-products are soluble therein. This includes for instance ethyl alcohol and other aliphatic alcohols and the like.

The mode of working with alkali cellulose and other alkylating agents, for instance alkyl halides, follows from what has been said above. Of course when using alkyl halides of low boiling point, for instance ethyl chloride and the like, both alkylation stages will be carried out in pressure vessels, preferably while stirring and only the removable water from the reaction mixtures of the first stage obtained from the alkyl celluloses of a low degree of alkylation, will be effected either at atmospheric or reduced pressure.

While above, in the specific description, I have referred especially to the conversion of water-soluble alkyl ethers of cellulose into more highly esterified ethers which are insoluble in water, it is to be understood that the invention embraces the further etherification of any partially etherfied cellulose (as well as partially etherified conversion products and derivatives of cellulose) into more completely etherified derivatives.

What I claim as my invention and desire to secure by Letters Patent is:—

1. A process of manufacturing ethers of cellulosic bodies by converting ethers of cellulose bodies of lower degrees of etherification into ethers of higher degrees of etherification, which process comprises conducting the further etherification of the ethers of lower degrees of etherification in the presence of an amount of water not substantially exceeding 6.83 times the weight of the cellulose under etherification.

2. A process of manufacturing ethers of cellulose bodies by converting ethers of lower degrees of etherification into ethers of higher degrees of etherification, which process comprises conducting the further etherification of the ethers of lower degrees of etherification in the presence of an amount of water not substantially above five times the weight of the cellulose under etherification.

3. A process of manufacturing ethers of cellulosic bodies by converting such ethers of lower degrees of etherification into ethers of higher degrees of etherification, which process comprises conducting the further etherification of the ethers of lower degrees of etherification in the presence of an amount of water not substantially above 6.83 times the weight of the cellulose used in the preparation of the primary material under etherification.

4. Process of manufacturing ethers of cellusosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially in excess of 6.83 times the weight of the cellulose under etherification, and then performing the further etherification.

5. Process of manufacturing ethers of cellulosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially more than 6.83 times the weight of the cellulose used in the preparation of the primary material under etherification, and then performing the further etherification.

6. A process of manufacturing ethers of cellulosic bodies by converting such ethers of lower degrees of etherification into ethers of higher degrees of etherification which process comprises first isolating the ethers of lower degrees of etherification from the reaction mixtures, and then further etherifying these ethers in the presence of an amount of water not substantially over 6.83 times the weight of the cellulose under etherification.

7. Process of manufacturing ethers of cellulosic bodies by converting such ethers of lower degrees of etherification into ethers of higher degrees of etherification which process comprises first isolating the ethers of lower degrees of etherification from the reaction mixtures and then further etherifying these ethers in the presence of an amount of water, not substantially over five times the weight of the cellulose used in the preparation of the primary material under etherification.

8. Process of manufacturing ethers of cellulosic bodies by converting such ethers of lower degrees of etherification into ethers of higher degrees of etherification which process comprises performing the further etherification of the ethers of lower degrees of etherification with caustic alkali and an ester of an inorganic acid, the amount of water present in the reaction mixture being between about five times and about 6.83 times the weight of the cellulose under etherification.

9. Process of manufacturing ethers of cellulosic bodies by converting such ethers of lower degrees of etherification into ethers of higher degrees of etherification which process comprises performing the further etherification of the ethers of lower degrees of etherification with caustic alkali and an ester of an inorganic acid, the amount of water present in the reaction mixture being not substantially in excess of five times the weight of the cellulose under etherification.

10. Process of manufacturing ethers of cellulosic bodies by converting such ethers of lower degrees of etherification into ethers of higher degrees of etherification which process comprises performing the further etherification of the ethers of lower degrees of etherification with caustic alkali in the form of a solution of not substantially below 40% strength, and an ester of an inorganic acid, the amount of water present in the reaction mixture being not substantially over 6.83 times the weight of the cellulose under etherification.

11. A process of manufacturing ethers of cellulosic bodies by converting such ethers of lower degrees of etherification into ethers of higher degrees of etherification which process comprises performing the further etherification of the ethers of lower degrees of etherification with caustic alkali in concentrated solution of at least 40% strength, and an ester of an inorganic acid, the amount of water present in the reaction mixture not exceeding about five times the weight of the cellulose.

12. A process of manufacturing ethers of cellulosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially exceeding 6.83 times the weight of the cellulose under etherification, and then performing the further etherification with caustic alkali in a concentrated state and an ester of an inorganic acid.

13. A process of manufacturing ethers of cellulosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially exceeding five times the weight of the cellulose, and then performing the further etherification with caustic alkali at least a part of which exists in the solid state and an ester of an inorganic acid.

14. A process of manufacturing ethers of cellulosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially over 6.83 times the weight of the cellulose under etherification, and then performing the further etherification with caustic alkali, a part at least of which exists in the form of a concentrated solution, and an ester of an inorganic acid.

15. A process of manufacturing ethers of cellulosic bodies by converting such ethers of lower degrees of etherification into ethers of higher degrees of etherification which process comprises first expelling water from the reaction mixtures containing the ethers of lower degrees of etherification to such an extent that the reaction mixture contains an amount of water not substantially over five times the weight of the cellulose under etherification, and then performing the further etherification with caustic alkali at least a part of which exists in concentrated solution and an ester of an inorganic acid.

16. A process of manufacturing ethers of cellulosic bodies by converting such ethers of lower degrees of etherification into ethers of higher degrees of etherification, which process comprises first mixing a material containing a partially etherified cellulosic body with an amount of alkali exceeding in weight the amount of water present in the mixture and then performing the further etherification.

17. A process of manufacturing ethers of cellulosic bodies by converting such ethers of lower degrees of etherification into ethers of higher degrees of etherification, which process comprises first mixing a reaction mixture containing a partially etherified cellulosic body with an amount of alkali exceeding in weight the amount of water present in the mixture and then performing the further etherification.

18. A process of converting a cellulose ether of a low degree of etherification into an ether of higher degree of etherification, which comprises removing at least a substantial part of the water from the reaction product of the low-etherification process, and then further etherifying the low etherification product, by reaction with an alkali and an etherifying agent.

19. In the production of ethers of cellulose, the step of evaporating away the water of a reaction product containing an ether of cellulose of low degree of etherification, at least until a dense cheesy pasty mass is produced.

20. In the production of ethers of cellulose, the step of evaporating away the water of a reaction product containing an ether of cellulose of low degree of etherification until a substance that is dry to the touch and readily rubbed to a powder, is produced.

21. The process of alkylating a cellulosic material containing unetherified hydroxyl groups which comprises the step of subjecting said material, while mixed with alkali in excess of the amount required by the said hydroxyl groups and mixed with water, the amount of said water being less than the weight of the alkali, to the action of an etherifying agent.

22. A process of producing highly etherified ethers of cellulose, which comprises reacting with an etherifying agent upon the ethers of low degree of etherification in the absence of sufficient water to make the mass freely liquid at room temperature whereby the amount of etherifying agent to be employed is low.

23. A process of forming highly etherified ethers of cellulosic bodies which comprises adding to a cellulose ether of low degree of etherification, while in a state of dryness at least as great as that corresponding to a dense cheesy pasty mass, a caustic alkali in substantially a solid state, and adding an etherifying agent thereto.

24. A process of forming highly etherified ethers of cellulosic bodies which comprises adding to a mass of a cellulosic material, all of which has been converted into ethers of low degree of etherification, while in a state of dryness at least as great as that corresponding to a dense cheesy pasty mass, a caustic alkali in substantially a solid state, and adding an etherifying agent thereto.

25. A process for the manufacture of alkyl derivatives of cellulose by converting their alkyl derivatives of lower degrees of alkylation into alkyl derivatives of higher degrees of alkylation, which comprises subjecting the alkyl derivatives of lower degrees of alkylation to further alkylation in the absence of more water than is necessary to form a pasty mass of the consistency of firm cheese.

26. Process of manufacturing ethers of cellulosic bodies by converting such ethers of lower degrees of etherification into ethers of higher degrees of etherification which process comprises adding caustic alkali to a reaction mass containing a cellulosic ether of a low degree of etherification to form a mixture containing an amount of water not substantially above 6.83 times the weight of the cellulose under etherification, and treating the thus obtained mass with an ester of an inorganic acid.

27. Process of manufacturing ethers of cellulosic bodies by converting such ethers of lower degrees of etherification into ethers of higher degrees of etherification which process comprises adding caustic alkali to a reaction mass containing a cellulosic ether of a lower degree of etherification to form a mixture containing an amount of water not substantially in excess of five times the weight of the cellulose under etherification and treating the thus obtained mass with an ester of an inorganic acid.

In testimony whereof I have signed my name to this specification in the presence of two subscribing witnesses.

LEON LILIENFELD.

Witnesses:
HERMANN WIMDERLICH,
FRANZ SCHIDENSKY.